United States Patent [19]

Inoue

[11] 4,211,976

[45] Jul. 8, 1980

[54] COMPOUND ACOUSTIC APPARATUS FOR AUTOMOTIVE VEHICLES

[75] Inventor: Nobutaro Inoue, Yokohama, Japan

[73] Assignee: Shintom Kabushiki Kaisha, Japan

[21] Appl. No.: 915,217

[22] Filed: Jun. 13, 1978

[30] Foreign Application Priority Data

Mar. 31, 1978 [JP] Japan .................................. 53-36679

[51] Int. Cl.² .............................................. H04B 1/06
[52] U.S. Cl. .................................... 455/344; 455/345; 455/349
[58] Field of Search ............... 325/111, 117, 119, 311, 325/312, 314, 352, 355, 356, 353; 312/7 R

[56] References Cited

U.S. PATENT DOCUMENTS

| | | | |
|---|---|---|---|
| 3,059,184 | 10/1962 | Germain | 325/312 |
| 3,091,736 | 5/1963 | Germain | 325/355 |
| 3,390,338 | 6/1968 | Race | 325/352 |

*Primary Examiner*—Marc E. Bookbinder
*Assistant Examiner*—Alexander Gerasimow
*Attorney, Agent, or Firm*—Robert E. Burns; Emmaneul J. Lobato; Bruce L. Adams

[57] ABSTRACT

A compound acoustic apparatus includes a radio receiver and a magnetic tape player which are adapted to be mounted on the interior panel such as the dashboard of an automobile. The apparatus includes a main unit formed with an opening in its front side, which is adapated to receive a tape cartridge which cooperates with the player and an operating unit having operating buttons, knobs and indicators of the player and the receiver mounted thereon and which is formed with a slot of a commensurate size as the cartridge receiving opening. The main unit and the operating unit are disposed on the opposite sides of the interior panel, which is also formed with a slot which provides a communication between the cartridge receiving opening and the slot formed in the operating unit.

7 Claims, 4 Drawing Figures

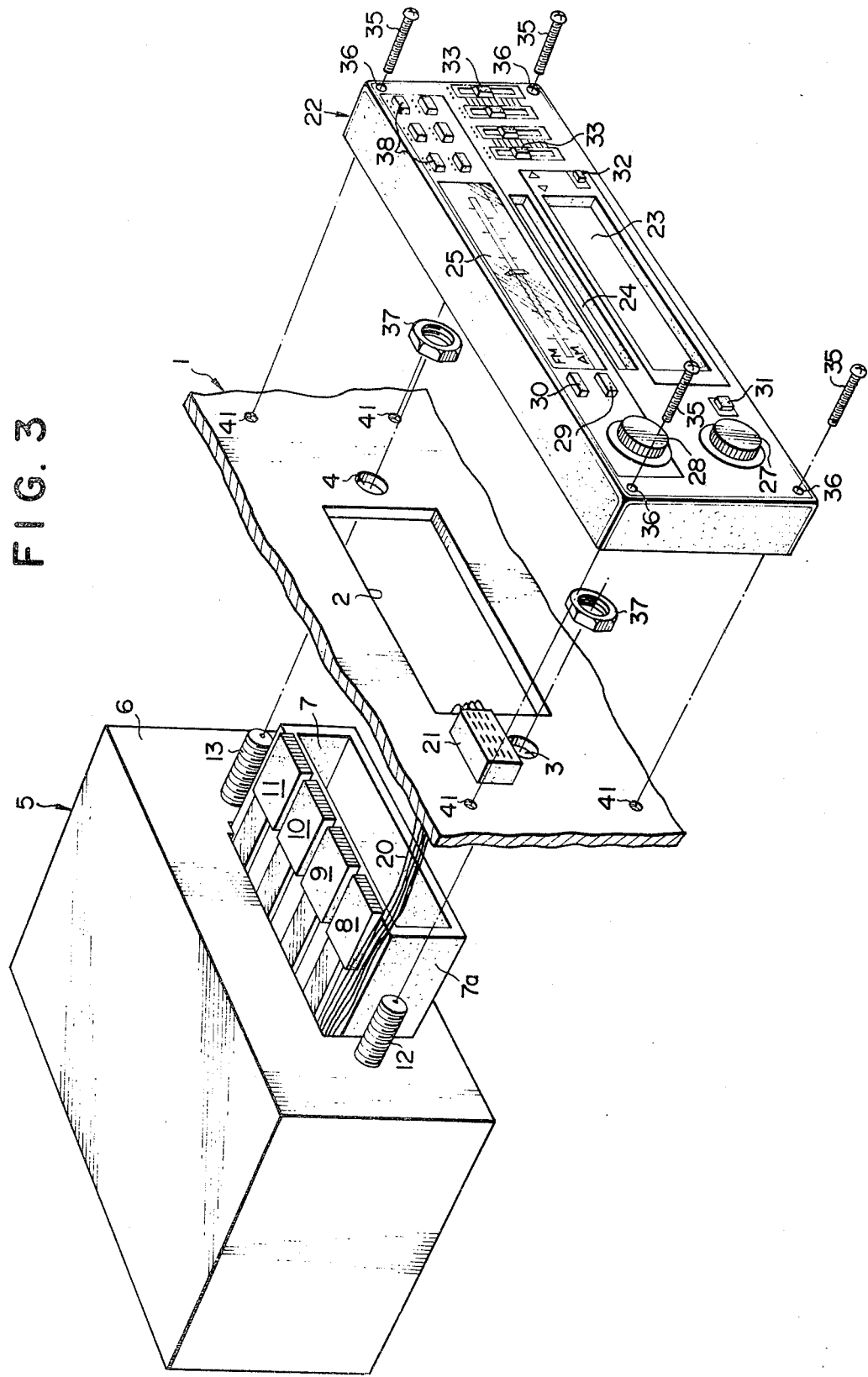

COMPOUND ACOUSTIC APPARATUS FOR AUTOMOTIVE VEHICLES

FIELD AND BACKGROUND OF THE INVENTION

The invention relates to a compound acoustic apparatus for automotive vehicles, and more particularly to such apparatus including a radio receiver and a magnetic tape player which is adapted to be mounted on an interior panel such as the dashboard or console panel of an automobile, for example.

A radio receiver of standard design which is used on automotive vehicles includes a control panel on its front surface. A horizontal array of tuning pushbuttons is disposed adjacent to the lower end of the panel while a horizontally elongate tuning dial extends along the upper end thereof. A manual rotary tuner knob is located on one lateral side of the panel while a rotary volume control is located on the other side and is coaxial with a power switch. To accommodate such a radio receiver, an automobile is usually provided with an interior panel such as a dashboard or a console panel which is formed with a rectangualr slot for exposing the central region of the operating panel including the tuning pushbuttons and the tuning dial when the radio receiver is mounted on the rear side of the panel. Additionally, the panel is formed with holes through which shafts associated with the rotary tuner and the volume control extend.

However, the recent trend of preference of car drivers shifts toward a high performance stereophonic radio receiver, or a compound acoustic apparatus which additionally includes a magnetic tape player cooperating with an eight-track tape magazine or four-track tape cassette. Such a high performance compound apparatus requires a number of controls including the switching between the radio and the tape operation, high and low tone control, loudness control, the balancing of left- and right-hand loudspeakers, the switching between a stereophonic and a monaural operation. This results in an increased number of controls such as knobs and buttons, which occupy an increased area of the front panel. Hence it is difficult to mount such an acoustic apparatus of an increased size on an interior panel which is formed with mounting slots and holes of conventional design.

DESCRIPTION OF THE PRIOR ART

When it is desired to mount an acoustic apparatus having a front operating panel of an increased size on an interior panel, it has been necessary heretofore to trim the panel by increasing the size of the mounting slots or holes. An alternative approach has been to secure a suitable support on the underside of the dashboard in order to suspend the acoustic apparatus therefrom. However, the trimming of the slots and holes requires a variety of machining tools and a corresponding level of skill, both of which are not available to anyone. Furthermore, there is a disadvantage that the mounting location of the apparatus is exposed on the interior panel. The suspension of the apparatus under the dashboard reduces the space left within the automobile which permits a free movement of a leg of car driver, thus resulting in a degraded comfortability.

SUMMARY OF THE INVENTION

It is an object of the invention to provide a compound acoustic apparatus for automotive vehicles which includes a radio receiver and a magnetic tape player.

It is another object of the invention to provide a compound acoustic apparatus for automotive vehicles which has an operating panel of an increased size but which can be directly mounted on an interior panel such as the dashboard, utilizing the conventional slots and holes.

In accordance with the invention, there is provided a compound acoustic apparatus including a radio receiver and a magnetic tape player and which is adapted to be mounted on an interior panel of an automotive vehicle. The panel is formed with a rectangular slot and a pair of circular holes located on the opposite sides thereof. The apparatus comprises a main unit including a housing which is formed with an opening in its front side for receiving a tape cartridge and which is of a smaller size than the slot formed in the panel. The apparatus also comprises an operating unit formed with a slot of a comparable size as the cartidge receiving opening. The operating unit internally houses control elements which controls the main unit, and is provided with a number of manual operating members on its front side which are used to operate the control elements. The apparatus also includes fastening means which secure the main unit to the rear side of the panel and which also secure the operating unit to the front side of the panel. Finally, connecting means is provided which provides an electrical interconnection between the main unit and the operating unit.

The main unit has mounting bolts which project therefrom and which are passed through holes previously formed in the interior panel, thus securing the main unit to the rear surface and the operating unit to the front surface of the panel. The slot or holes formed in the interior panel need to be changed, and the operating unit may have an incerased size without being limited by the size of the slot or holes. Since various controls including knobs and buttons are mounted on the operating unit, it is possible to provide as many control elements as desired which can be operated by these controls. In this manner, a compound acoustic apparatus of high performance and special design can be mounted on the interior panel in a facilitated manner.

BRIEF DESCRIPTION OF THE DRAWINGS

FIG. 3 is an exploded perspective view of another embodiment of the invention.

DESCRIPTION OF PREFERRED EMBODIMENTS

Figure 1:
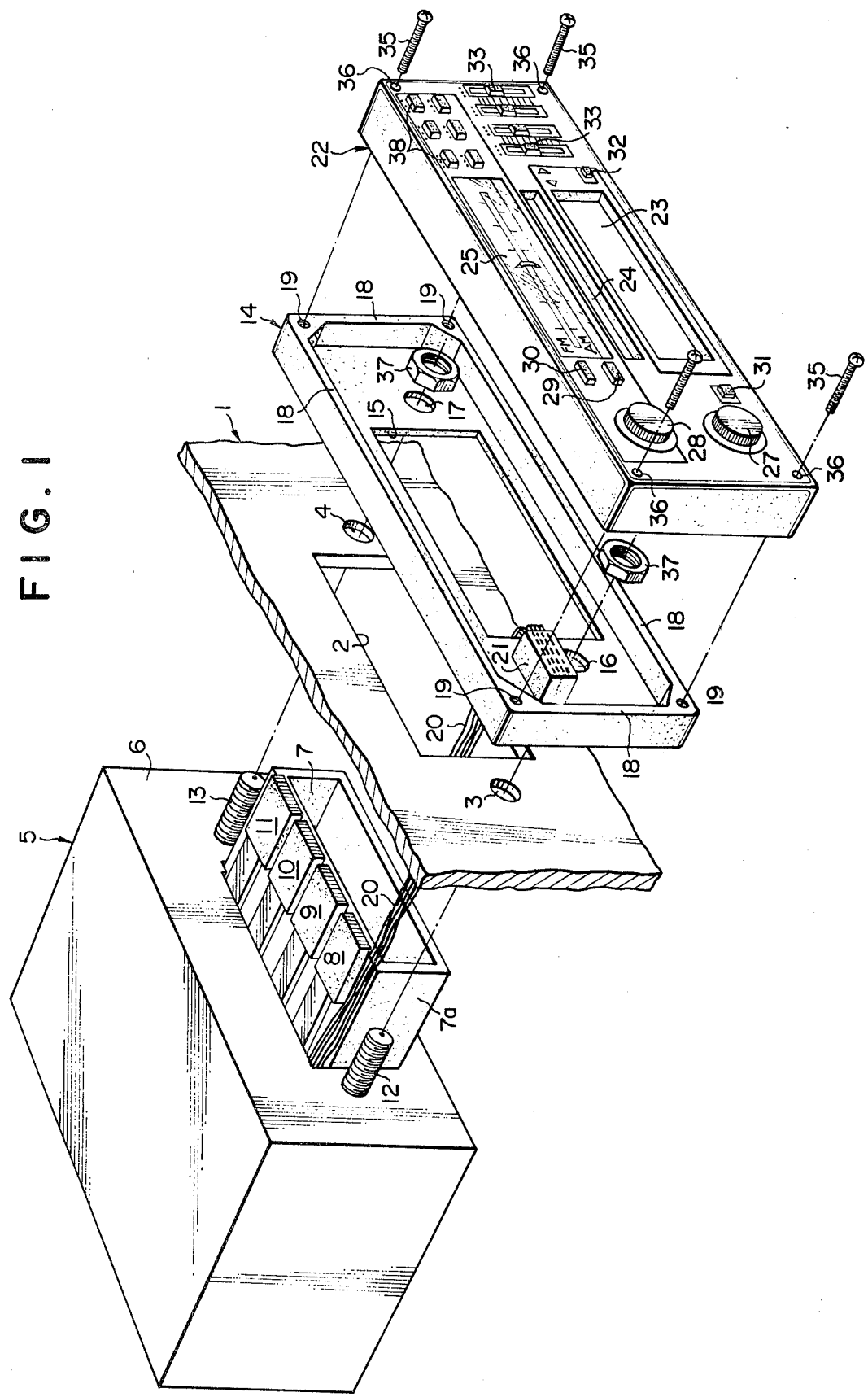
FIG. 1 is an exploded, perspective view of a compound acoustic apparatus according to the invention.
Figure 2:
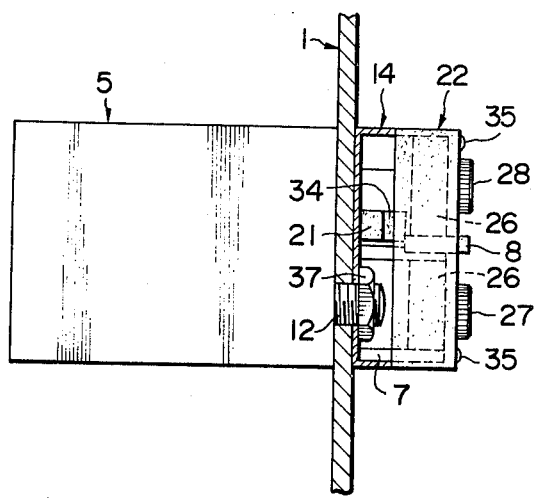
FIG. 2 is a side elevation, partly in section, of the apparatus, illustrating the mounting thereof.

Referring to FIGS. 1 and 2, there is shown a dashboard 1 of an automobile which is formed with a rectangular slot 2 and a pair of holes 3, 4 located on the opposite sides of the slot. The compound acoustic apparatus of the invention includes a main unit 5 disposed on the rear surface of the dashboard 1 and an operating unit 22 which is disposed on the front surface of the dashboard.

The main unit 5 includes a front side 6 which receives a tape housing 7a, which is in turn formed with a tape cartridge receiving opening 7. Four buttons, including a tape rewind button 8, channel switching button 9, rapid advance button 10 and eject button 11, are disposed in a horizontal array atop the housing 7a. A pair of mounting threaded bolts 12, 13 have their one end secured to the front side 6, and extend through the holes 4, 5 when the housing 7a and buttons 8 to 11 are fitted into the slot 2 formed in the dashboard 1. The main unit 5 is secured in place by locking nuts 37 which threadably engage the bolts 12, 13 after the parts 7a, 12, 13 are inserted into mating slot and holes 2, 3 and 4.

A rectangular mounting frame 14 is placed on the front side of the dashboard, and is centrally formed with a rectangular slot 15 of a comparable size as the slot 2. A pair of holes 16, 17 are formed in the frame 14 on the opposite lateral sides of the slot 15 for receiving the threaded bolts 12, 13, respectively. The nuts 37 are engaged with the bolts 12, 13 after the frame is set in place. The frame 14 is peripherally provided with a rib 18, the four corners of which are provided with threaded holes 19. A female connector 21 is mounted on the front side of the frame 14 at a suitable location and is connected with a plurality of lead wires 20 which provide an electrical interconnection between the main unit 5 and the operating unit 22. It should be understood that the connector 21 is provided with a number of sockets which are equal in number to the number of lead wires 20.

The operating unit 22 is mounted on the frame 14, and is centrally formed with a slot 23, into which the opening 7 of the main unit 5 extend. An elongate slot 24 extends horizontally above the slot 23 for exposing the buttons 8 to 11 of the main unit 5. The operating unit includes a tuning dial 25 associated with a radio receiver and which is located above the elongate slot 24. The unit 22 has a number of control elements 26 such as tuning control, AM-FM switch, loudness control or elements which electrically control the main unit 5. Manual operating members which operate these control elements 26 are mounted on the front side of the operating unit 22. In the example shown, these members include a volume control knob 27, tuning knob 28, AM reception button 29, FM reception button 30, power switch button 31, Dolby switching button 32, two pairs of sliding variable resistor knobs 33, six switch buttons 38. Two pairs of knobs 33 are provided for the treble and bass control of each of the left- and right-hand channels. Six switch buttons 38 relate to the switching of an antenna input, stereophonic-monaural switching, low pass filter, high pass filter, mounting and loudness control. A male connector 34 is mounted on the rear surface of the operation unit 22 and fittingly engages the female connector 21 on the frame 14 when the operating unit is fixedly mounted on the frame 14. The male connector 34 has a plurality of pins which are equal in number to the number of sockets in the female connector 21 and which are connected with associated terminals of corresponding control elements 26. Four corners of the operating unit 22 are formed with through-holes 36 for receiving setscrews which secure the operating unit 22 to the frame 14.

When mounting the acoustic apparatus on the dashboard 1, the main unit 5 is initially disposed behind the dashboard and moved forwardly so that the housing 7a and the buttons 8 to 11 extend through the opening 2 and the bolts 12, 13 extend through the holes 3, 4, respectively. The frame 14 is then placed against the front surface of the dashboard 1 so that the slot 15 is aligned with the slot 2, thus allowing the bolts 12, 13 to extend through the holes 16, 17. Locking nuts 37 are then engaged with the threaded bolts 12, 13, respectively, thus mounting the main unit 5 on the rear side of the dashboard 1. Female connector 21 is then mounted on and secured, as by adhesive, on the frame 14 at a location in which it can be engaged by the male connector 34 on the operating unit 22. Subsequently the operating unit 22 is placed against the frame 14, with its rear side facing the latter, thus allowing the buttons 8 to 11 and the housing 7a to extend into the elongate slot 24 and slot 23, respectively. The male connector 34 is engaged with the female connector 21. Setscrews 35 are then inserted into the holes 36 to threadably engage the threaded holes 19, thus mounting the operating unit 22 on the frame 14. In this manner, the main unit 5 and the operating unit 22 are electrically and mechanically coupled together with the dashboard 1 interposed therebetween.

Figure 4:
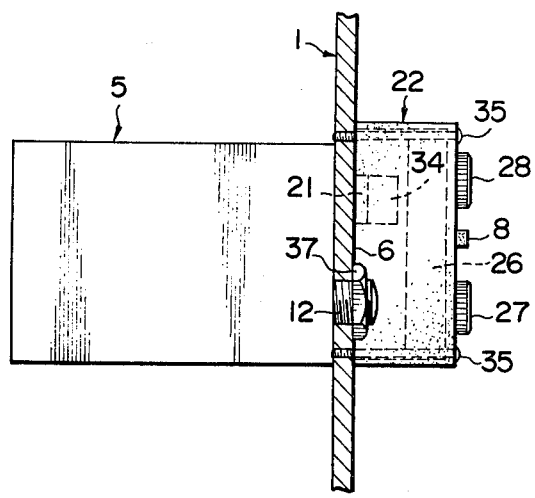
FIG. 4 is a side elevation, partly in section, of the apparatus shown in FIG. 3, illustrating the mounting thereof.

FIGS. 3 and 4 show another embodiment of the invention in which the mounting frame 14 is dispensed with, and the main unit 5 and the operating unit 22 are directly mounted on the dashboard 1. In these Figures, corresponding parts are designed by like reference numerals. In this embodiment, the dashboard 1 is additionally formed with threaded holes 41 which are adapted to receive setscrews 35. It will be appreciated that the provision of such threaded holes requires no particular level of skill. The threaded bolts 12, 13 extend through holes 3, 4 formed in the dashboard 1 and threadably engage with locking nuts 37 which are screwed thereon to secure the main unit 5 in place on the dashboard 1. Female connector 21 is mounted on the front surface of the dashboard 1 at a location engageable with male connector 34. The rear surface of the operating unit 22 is then placed against the front surface of the dashboard, and after engaging the connectors 34, 21 together, setscrews 35 are inserted through holes 36 and threadably engaged with threaded holes 41 formed in the dashboard 1, thus mounting the operating unit 22 on the dashboard. It will be appreciated that female or male connector may be provided on the front surface 6 of the main unit 5 so as to project through the opening 2 formed in the dashboard 1.

It is to be understood that the arrangement of pushbuttons associated with the main unit or player is illustrative only as is the disposition of manual operating buttons or arrays on the operating unit. The arrangement of such parts form no part of the invention. By way of example, in the embodiments described above, the player has been shown as a cassette tape player, which however may be replaced by an eight-track tape magazine player. In this instance, rewind or rapid advance buttons are unnecessary. Operating buttons associated with the magnetic tape player have been shown as provided on the main unit, but may be transferred onto the operating unit. In addition, the tuning dial may be transferred onto the main unit rather than on the operating unit as shown. In this instance, the operating unit is provided with a transparent window through which the dial can be viewed.

What is claimed is:

1. A compound acoustic apparatus including a radio receiver and a magnetic tape player and adapted to be mounted on an interior panel of an automative vehicle which is formed with a rectangular first opening and a pair of circular holes located at opposite ends of the opening; the apparatus comprising a main unit including a housing having a front side in which a second opening is formed for receiving a tape cartridge which cooperates with the player, said second opening being smaller in size than said first opening, an operating unit formed with a third opening of a comparable size as said second opening and carrying a plurality of control elements which control the main unit, the operating unit carrying a plurality of manual operating members on its front side which operate the control elements, first fastening means extending through said holes for securing the main unit on the rear side of the interior panel and second fastening means for securing the operating unit on the front side of the interior panel in a manner such that said third opening formed in the operating unit communicates with said second opening formed in the main unit through said first opening formed in the interior panel, whereby a tape cartridge is insertable through said third and first openings into said second opening of said main unit, and connecting means for providing an electrical interconnection between the main unit and the operating unit.

2. A compound acoustic apparatus according to claim 1, in which said first fastening means comprises a pair of bolts having their one end mounted on the main unit and their free end extending through said holes formed in said interior panel, a pair of nuts threadably engaging said bolts on the opposite side of the interior panel, and said second fastening means comprises a plurality of screws for securing said operating unit to said interior panel.

3. A compound acoustic apparatus according to claim 1, in which said first fastening means comprises a mounting frame formed with a fourth opening and second holes which correspond respectively to said first opening and the holes formed in the interior panel, a pair of bolts having their one end mounted on the main unit and their other end extending through the holes formed in the interior panel and in said frame, and a plurality of nuts threadably engaging the bolts on the opposite side of the frame from the interior panel, and said second fastening means comprises a plurality of screws for securing the operating unit to the frame.

4. A compound acoustic apparatus according to claim 1, in which the connecting means comprises a pair of detachable male and female members, one of the members being mounted on the interior panel, and the other member being mounted on the operating unit.

5. A compound acoustic apparatus according to claim 1, in which the connecting means comprises a pair of detachable male and female members, one of the members being mounted on the fastening means, and the other member being mounted on the operating unit.

6. A compound acoustic apparatus according to claim 1, in which said first fastening means comprises a mounting frame having a fourth opening and second holes which correspond respectively to said first opening and the holes formed in said interior panel, and a pair of bolts extending through said second holes and said holes in said interior panel and connecting said main unit and said frame, and a second fastening means comprises a plurality of screws securing said operating unit to said frame, and in which said connecting means comprises a pair of multi-conductor detachable male and female members of which one is mounted on said operating unit and the other is mounted on said frame and is electrically connected with said main unit.

7. A compound acoustic apparatus according to claim 1, in which manually operable control buttons for said tape player are provided on said main unit adjacent said second opening and are accessible through said first and third openings.

* * * * *